US006530362B1

United States Patent
Yanagii

(10) Patent No.: US 6,530,362 B1
(45) Date of Patent: Mar. 11, 2003

(54) TANDEM VALVE TYPE THROTTLE BODY

(75) Inventor: Yoichi Yanagii, Kawasaki (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 10/193,655

(22) Filed: Jul. 10, 2002

(30) Foreign Application Priority Data

Jul. 16, 2001 (JP) .................................. 2001-214831

(51) Int. Cl.⁷ .............................................. F02M 7/00
(52) U.S. Cl. .................................................. 123/442
(58) Field of Search .............................. 123/442, 443, 123/444, 434

(56) References Cited

U.S. PATENT DOCUMENTS 4,276,862 A * 7/1981 Matsumoto ................. 123/432
4,378,000 A * 3/1983 Moriya et al. .............. 123/442
4,462,367 A * 7/1984 Tanabe et al. .............. 123/442
4,870,934 A * 10/1989 Vanetta et al. .............. 123/336

* cited by examiner

Primary Examiner—Bibhu Mohanty
(74) Attorney, Agent, or Firm—ZITO tlp; Joseph J. Zito

(57) ABSTRACT

To provide a tandem valve type throttle body in which a closing direction of a second throttle valve is not restricted to one side, can an intake efficiency can be improved, and an entire length of a throttle body can be reduced, a butterfly type first throttle valve (3) is attached to a first throttle valve shaft (4) and operated by an accelerator, a butterfly type second throttle valve (5) is disposed in an upstream side of the first throttle valve (3) and attached to a second throttle valve shaft (6), the second throttle valve (5) is formed in an always open type and operated so as to be closed by an electromagnetic actuator, an axial pitch (P) between the first throttle valve shaft (4) and the second throttle valve shaft (6) is twice a radius (R) of the throttle valve (3) or less, and a notch portion (5B) is formed in the second throttle valve (5) in correspondence to an interference portion on planes of both the throttle valves (3, 5) at a time of fully opening both the throttle valves (3, 5).

2 Claims, 2 Drawing Sheets

TANDEM VALVE TYPE THROTTLE BODY

BACKGROUND OF THE INVENTION

1. Field of the Invention

The present invention relates to a throttle body which controls an amount of air moving toward an internal combustion engine, and more particularly to a tandem valve type throttle body which is provided with a first throttle valve controlled so as to be opened and closed by an accelerator within an intake passage provided in the throttle body, and a second throttle valve of normally open type arranged in an upstream side of the first throttle valve in the intake passage and operated so as to be closed by an electromagnetic actuator or the like.

2. Description of Conventional Art

A conventional tandem valve type throttle body is shown in Japanese Utility Model No. 2546063.

In accordance with the tandem valve type throttle body mentioned above, there is disclosed a structure in which valve opening directions of the first throttle valve and the second throttle valve arranged in the upstream side of the first throttle valve are set to the same direction, a full-open position of each of the throttle valves is set to a rotational angle before each of the throttle valves matches to an axial line of the intake passage, an outer periphery of each of the throttle valves as seen in an axial direction of the intake passage at the rotational angle position is set to be within a range of a diameter of a throttle valve shaft, and a distance between both the throttle valve shafts is set to be shorter than twice a radius of the throttle valve.

Then, the first throttle valve is operated so as to be opened and closed by the accelerator, and the second throttle valve is operated so as to be closed by the electromagnetic actuator or the like. For example, at a time of traction control or the like, the second throttle valve is forcibly closed, whereby a torque of the engine is reduced at a time when a slip is generated.

In accordance with the conventional tandem valve type throttle body, it is possible to reduce a length of the intake passage in the throttle body in a longitudinal direction, however, there are the following problems.

First of all, the valve opening directions of the first throttle valve and the second throttle valve are set to be the same direction. Accordingly, in particular, a rotational direction of a second throttle valve lever which is attached to an end portion of the second throttle valve shaft for rotating the second throttle valve is definitely determined, and a freedom of design of the second throttle valve lever is largely restricted.

This is not preferable particularly for a motor cycle because the throttle body is arranged within a narrow limited space between the engine and a fuel tank or the like. That is, the freedom of design of the second throttle valve lever is limited by restricting the rotational direction of the second throttle valve lever to the same direction as the opening direction of the second throttle valve.

Secondly, the full-open positions of the first throttle valve and the second throttle valve are set to the rotational angle position before matching to the longitudinal axial line of the intake passage, and it is impossible to arrange both the throttle valves in parallel to the longitudinal axial line of the intake passage.

In accordance with this structure, a gap is formed between an upstream end portion of the first throttle valve and a downstream end portion of the second throttle valve and it is impossible to sufficiently obtain an effect of rectifying an air flowing through the intake passage, so that it is hopeless to improve an air intake efficiency.

SUMMARY OF THE INVENTION

The present invention is made by taking the problem mentioned above into consideration, and an object of the present invention is to provide a tandem valve type throttle body which does not restrict a closing direction of a second throttle valve to a single direction, can achieve an improvement of an intake efficiency at a time of fully opening the first and second throttle valves, and can reduce an entire length of a throttle body.

In order to achieve the object mentioned above, in accordance with a first aspect of the present invention, there is provided a tandem valve type throttle body comprising:

an intake passage provided through an inner portion of the throttle body;

a first throttle valve which opens and closes the intake passage interlocking with an accelerator;

a second throttle valve of normally open type which is disposed in an upstream side of the first throttle valve and is operated so as to be closed, the first throttle valve and the second throttle valve being arranged within the intake passage, wherein the first throttle valve is formed in a butterfly type and is attached to a first throttle valve shaft which is rotatably supported to the throttle body across the intake passage, the second throttle valve is formed in a butterfly type, is attached to a second throttle valve shaft which is rotatably supported the throttle body across the intake passage, with a pitch between both the throttle valve shafts being set to be twice a radius of the throttle valves or less, and a notch portion is formed in the second throttle valve in correspondence to an interference portion on planes of both the throttle valves at a time of fully opening both the throttle valves.

Further, in accordance with a second aspect of the present invention, there is provided a tandem valve type throttle body as recited in the first aspect mentioned above, wherein centers in rotation of the first throttle valve shaft and the second throttle valve shaft, and centers of thickness portions of the first throttle valve and the second throttle valve are arranged on an axial line in a longitudinal direction of the intake passage, and both the throttle valves in directions of fluid flows within the intake passage are arranged within a surface of projection in the directions of the fluid flows of both the throttle valve shafts, at a time of fully opening the first throttle valve and the second throttle valve.

In accordance with the first aspect of the present invention, since the notch portion is formed in the second throttle valve in correspondence to the interference portion on the planes of both the throttle valves at a time of fully opening the first throttle valve and the second throttle valve, the operation of the second throttle valve in the closing direction may be performed in any one of a clockwise direction and a counterclockwise direction, and the closing direction is not limited to one direction.

Further, it is possible to reduce the pitch between both the throttle valve shafts in correspondence to the interference portion, whereby it is possible to reduce an entire length of the throttle body.

Further, in accordance with the second aspect of the present invention, since the centers in rotation of the first throttle valve shaft and the second throttle valve shaft, and the centers of the thickness portions of the first throttle valve and the second throttle valve are arranged on the axial line in the longitudinal direction of the intake passage, and both the throttle valves in the directions of the fluid flows within the intake passage are arranged within the surface of projection in the directions of the fluid flows of both the throttle valve shafts, at a time of fully opening the first throttle valve and the second throttle valve, it is possible to increase an effect of rectifying the fluid flowing within the intake passage and it is possible to improve an intake efficiency.

DESCRIPTION OF THE PREFERRED EMBODIMENT

A description will be given below of an embodiment of a tandem valve type throttle body in accordance with the present invention with reference to the accompanying drawings.

Figure 1:
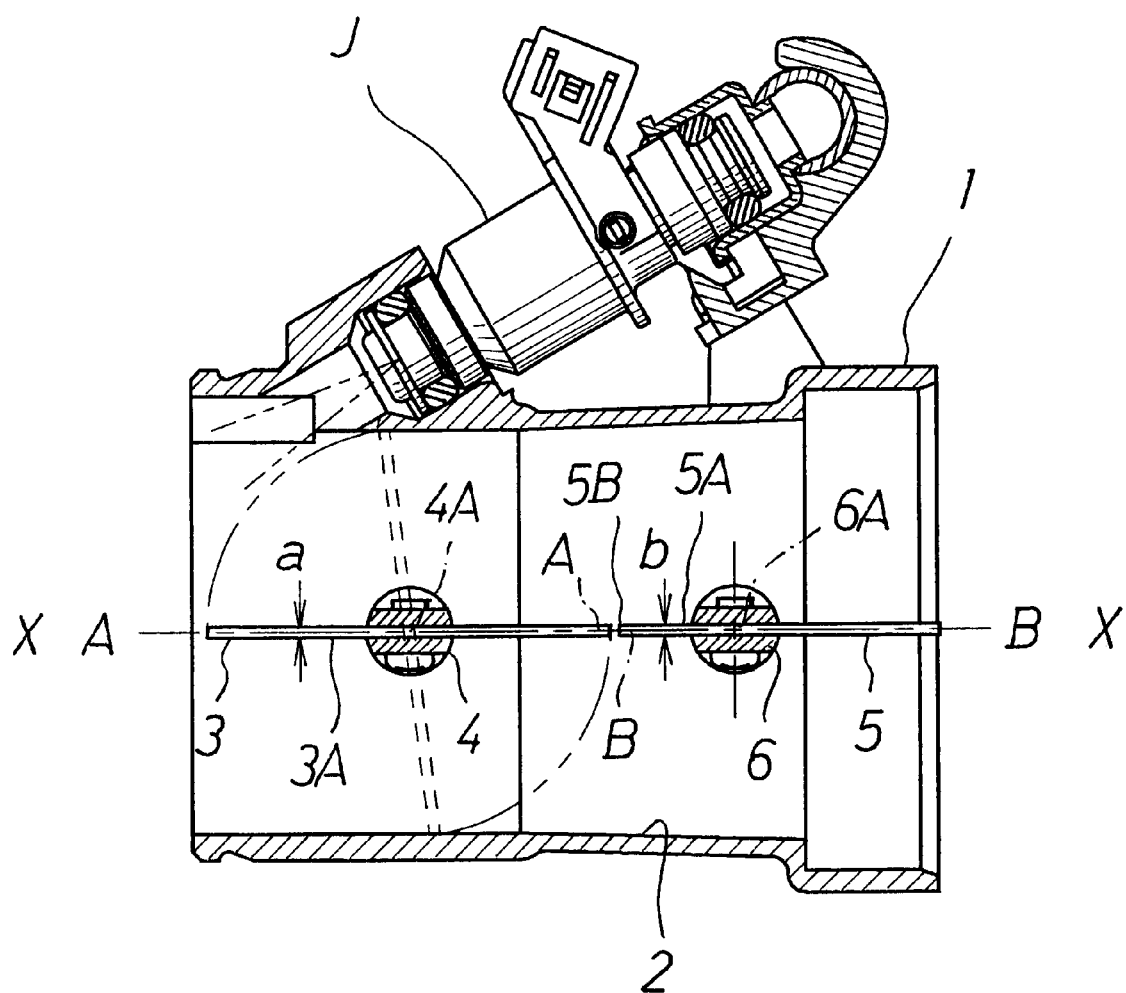
FIG. 1 is a vertical cross sectional view of a tandem valve type throttle body in accordance with the present invention.
Figure 2:
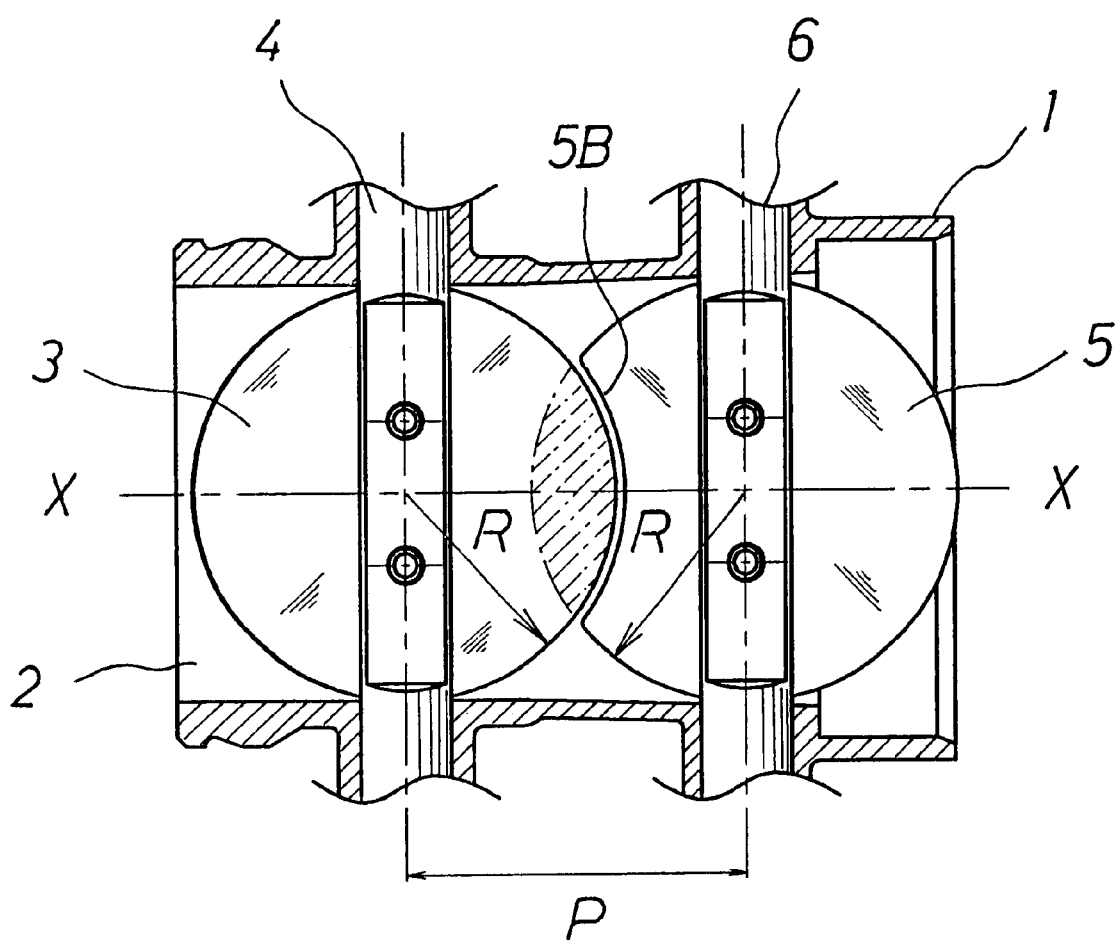
FIG. 2 is a horizontal cross sectional view in a center line of FIG. 1.

FIG. 1 is a vertical cross sectional view of a main portion thereof, and FIG. 2 is a horizontal cross sectional view in a center X—X in FIG. 1.

Reference numeral 1 denotes a throttle body in which an intake passage 2 is provided in an inner portion so as to pass through sideward. A first throttle valve 3 formed in a butterfly type is arranged in the intake passage 2 in a downstream side.

The first throttle valve 3 is arranged in a center of the intake passage 2 and along a longitudinal axial line X—X of the intake passage 2, and is attached to a first throttle valve shaft 4 which is rotatably supported to the throttle body 1. (The first throttle valve shaft 4 is also arranged on the longitudinal axial line X—X of the intake passage 2.)

Further, a first throttle valve lever (not shown) is fixed to an end portion of the first throttle valve shaft 4 which protrudes out of the throttle body 1, and this first throttle valve lever is connected to an accelerator grip by an accelerator wire. (None of the accelerator grip and the accelerator wire are illustrated.)

With reference to FIG. 1, when the first throttle valve lever are rotated in a counterclockwise direction by operating the accelerator grip, the first throttle valve shaft 4 and the first throttle valve 3 are also synchronously rotated in a counterclockwise direction, and the intake passage 2 is opened by the first throttle valve 3 in correspondence to an operation amount of the accelerator grip.

In the structure mentioned above, a rotational center 4A of the first throttle valve shaft 4 is arranged on the longitudinal axial line X—X of the intake passage 2, and a center A—A of a thickness portion 3A having a thickness a in the first throttle valve 3 is arranged on the longitudinal axial line X—X of the intake passage 2 at a time of fully opening the first throttle valve 3.

Reference numeral 5 denotes a second throttle valve which is arranged within the intake passage 2 in an upstream side from the first throttle valve 3 (a right side in the drawing).

The second throttle valve 5 is arranged in the center of the intake passage 2 and along the longitudinal axial line X—X of the intake passage 2, and is attached to a second throttle valve shaft 6 which is rotatably supported to the throttle body 1. (The second throttle valve shaft 6 is also arranged on the longitudinal axial line X—X of the intake passage 2.)

A second throttle valve lever (not shown) is fixed to an end portion of the second throttle valve shaft 6 which protrudes out of the throttle body 1, and this second throttle valve lever is operated by an electromagnetic actuator (not shown) which is driven on the basis of an output signal from an ECU (not shown)

In the structure mentioned above, a rotational center 6A of the second throttle valve shaft 6 is arranged on the longitudinal axial line X—X of the intake passage 2, and a center B—B of a thickness portion 5A having a thickness b in the second throttle valve 5 is arranged on the longitudinal axial line X—X of the intake passage 2 at a time of fully opening the second throttle valve 5.

In this case, the second throttle valve 5 is structured as a normally open type valve which is normally kept in a full-open state, and is operated so as to be closed by an electromagnetic actuator which is driven by an output signal of the ECU.

Further, an axial pitch P between the first throttle valve shaft 4 and the second throttle valve shaft 6 is set to be twice a radius R of the first and second throttle valves 3 and 5 or less.

In this case, in accordance with the structure in which the axial pitch P between the first and second throttle valve shafts 4 and 6 is set to be twice the radius R of the throttle valves or less, since a right end portion of the first throttle valve 3 and a left end portion of the second throttle valve 5 are interfered with each other at a time of fully opening the first and second throttle valves 3 and 5, a notch portion 5B is provided in the left end portion of the second throttle valve 5 in correspondence to the interference portion.

The interference portion is shown by a single dot chain line in FIG. 2.

In accordance with the structure mentioned above, at a time of fully opening the first and second throttle valves 3 and 5, the throttle valves are not brought into direct contact with each other.

In this case, reference symbol J denotes a fuel injection valve which injects and supplies a fuel toward an inner portion of the intake passage 2. The fuel injection valve J is also driven on the basis of the output signal from the ECU, and a fuel is injected in correspondence to an operation state of the engine.

Next, a description will be given of an operation thereof.

In a state in which the electromagnetic actuator (not shown) controlling the second throttle valve 5 is not driven, the second throttle valve 5 is kept in a full-open state, and on the other hand, the first throttle valve 3 is opened and closed in accordance with an accelerator operation performed by a driver.

In accordance with the structure mentioned above, since the first throttle valve 3 opens and closes the intake passage 2 in correspondence to the accelerator operation, it is possible to supply a suitable air in correspondence to the accelerator operation toward the engine.

Further, at a time of operating so as to open and close the first throttle valve 3, the second throttle valve 5 kept in the full-open state and the first throttle valve 3 are not brought into contact and interfered with each other.

This is because the notch portion 5B is provided in the second throttle valve 5.

On the other hand, taking into consideration the full-open state of the first throttle valve 3, it is possible to improve an intake efficiency of air flowing through the intake passage 2.

This is because of the following reasons. First of all, the rotational center 4A of the first throttle valve shaft 4 and the rotational center 6A of the second throttle valve shaft 6, and the center A—A of the thickness portion 3A of the first throttle valve 3 and the center B—B of the thickness portion 5A of the second throttle valve 5 are arranged on the longitudinal axial line X—X of the intake passage 2. Secondly, the first throttle valve 3 in the fluid flowing direction within the intake passage 2 is arranged within a surface of projection in the fluid flowing direction of the first throttle valve shaft 4 at a time of fully opening the first throttle valve 3, and the second throttle valve 5 in the fluid flowing direction within the intake passage 2 is arranged within a surface of projection in the fluid flowing direction of the second throttle valve shaft 6 at a time of fully opening the second throttle valve 5.

In accordance with the first reason, since the first throttle valve 3 and the second throttle valve 5 are horizontally arranged in the longitudinal axial line X—X of the intake passage 2 as one flat plate at a time of fully opening the first throttle valve 3 and the second throttle valve 5, it is possible to obtain an effect of rectifying the air stream flowing within the intake passage 2.

Further, in accordance with the second reason, since the first throttle valve 3 and the second throttle valve 5 are arranged within the surface of projection in the fluid flowing direction of the first and second throttle valve shafts 4 and 6 at a time of fully opening the first throttle valve 3 and the second throttle valve 5, an effective area of the intake passage 2 is not reduced over the throttle valve shafts 4 and 6.

In accordance with the structure mentioned above, it is possible to achieve an improvement of an intake efficiency.

Further, in the case of a traction control time or the like, when the drive signal is output from the ECU to the electromagnetic actuator and the electromagnetic actuator is operated, the operation is transmitted to the second throttle valve shaft 6 via a second throttle valve lever (not shown), and the second throttle valve 5 closes the intake passage 2 in response to the operation of the electromagnetic actuator so as to reduce an amount of air moving toward the engine, thereby reducing the torque of the engine, so that it is possible to restrict a generation of slip.

In this case, paying attention to the second throttle valve 5, since the notch portion 5B is provided in the second throttle valve 5 in correspondence to the interference portion with the first throttle valve 3, no limitation is required in a direction of rotation at a time when the second throttle valve 5 is rotated in the closing direction.

In short, the second throttle valve 5 may be rotated in the clockwise direction or the counterclockwise direction. In accordance with the structure mentioned above, since the rotational direction of the second throttle valve lever which is connected to the electromagnetic actuator and applies the rotational force to the second throttle valve shaft 6 is not limited, it is possible to largely improve a freedom of design of the second throttle valve lever, and an effect can be particularly obtained in a structure in which a receiving space around the throttle body 1 is limited such as a motor cycle.

Further, since the notch portion 5B is provided in the second throttle valve 5, it is possible to reduce the axial pitch P between the first throttle valve shaft 4 and the second throttle valve shaft 6 in correspondence to the notch portion 5B, whereby it is possible to reduce the entire length of the throttle body 1.

As mentioned above, in accordance with the tandem valve type throttle body of the present invention, since the axial pitch between the first and second throttle valve shafts is set to be twice the radius of the throttle valve or less and the notch portion is formed in the second throttle valve in correspondence to the interference portion on the planes of both the throttle valves at a time of fully opening both the throttle valves, the rotating direction of the second throttle valve shaft in the closing direction (in other word, the rotation of the second throttle valve lever in the closing direction) is not limited to one direction. Accordingly, it is possible to increase the freedom of design of the second throttle valve lever, and it is possible to reduce the entire length of the throttle body in correspondence to the axial pitch between the first and second throttle valve shafts.

Further, since the centers in rotation of the first throttle valve shaft and the second throttle valve shaft, and the centers of the thickness portions of the first throttle valve and the second throttle valve are arranged on the axial line in the longitudinal direction of the intake passage, and both the throttle valves in the directions of the fluid flows within the intake passage are arranged within the surface of projection of both the throttle valve shafts, at a time of fully opening the first throttle valve and the second throttle valve, it is possible to improve an intake efficiency.

What is claimed is:

1. A tandem valve type throttle body comprising:
   an intake passage provided through an inner portion of the throttle body;
   a first throttle valve which opens and closes the intake passage interlocking with an accelerator;
   a second throttle valve of normally open type which is disposed in an upstream side of the first throttle valve and is operated so as to be closed,
   said first throttle valve and said second throttle valve being arranged within said intake passage,
   wherein the first throttle valve (3) is formed in a butterfly type and is attached to a first throttle valve shaft (4) which is rotatably supported to the throttle body (1) across the intake passage (2),
   the second throttle valve (5) is formed in a butterfly type, is attached to a second throttle valve shaft (6) which is rotatably supported the throttle body (1) across the intake passage (2), with a pitch (P) between both the throttle valve shafts (4, 6) being set to be twice a radius (R) of the throttle valves (3, 5) or less, and
   a notch portion (5B) is formed in the second throttle valve (5) in correspondence to an interference portion on planes of both the throttle valves (3, 5) at a time of fully opening both the throttle valves (3, 5).

2. A tandem valve type throttle body as claimed in claim 1, wherein centers (4A, 6A) in rotation of said first throttle valve shaft and the second throttle valve shaft (6), and centers (A—A, B—B) of thickness portions (3A, 5A) of the first throttle valve (3) and the second throttle valve (5) are arranged on an axial line (X—X) in a longitudinal direction of the intake passage (2), and both the throttle valves (3, 5) in directions of fluid flows within the intake passage (2) are arranged within a surface of projection in the directions of the fluid flows of both the throttle valve shafts (4, 6), at a time of fully opening said first throttle valve and the second throttle valve (5).

* * * * *